US011935672B2

(12) United States Patent
Kawalec et al.

(10) Patent No.: US 11,935,672 B2
(45) Date of Patent: Mar. 19, 2024

(54) POWER CABLE ASSEMBLY FOR A POWER DISTRIBUTION SYSTEM HAVING AN INTEGRATED COOLING SYSTEM

(71) Applicant: Aptiv Technologies AG, Schaffhausen (CH)

(72) Inventors: Dominik Kawalec, Brzoskwinia (PL); Monika Pieszka-Lyson, Cracow (PL); Pawel Kozak, Cracow (PL); Grzegorz Porebski, Podłże (PL); Grzegorz Paletko, Zabierzów (PL)

(73) Assignee: Aptiv Technologies AG, Schaffhausen (CH)

(*) Notice: Subject to any disclaimer, the term of this patent is extended or adjusted under 35 U.S.C. 154(b) by 0 days.

(21) Appl. No.: 17/876,299

(22) Filed: Jul. 28, 2022

(65) Prior Publication Data

US 2023/0035457 A1    Feb. 2, 2023

(30) Foreign Application Priority Data

Jul. 30, 2021 (EP) ..................... 21188670

(51) Int. Cl.
H01B 7/42 (2006.01)
H01B 7/02 (2006.01)
(Continued)

(52) U.S. Cl.
CPC ............ H01B 7/423 (2013.01); H01B 7/02 (2013.01); H01B 9/006 (2013.01); H02B 1/20 (2013.01); H02B 1/56 (2013.01)

(58) Field of Classification Search
USPC ...................................................... 174/15.6
See application file for complete search history.

(56) References Cited

U.S. PATENT DOCUMENTS 1,539,490 A * 5/1925 Vasser ................ H01B 9/0611
427/105
4,690,204 A    9/1987 Reichel et al.
(Continued)

FOREIGN PATENT DOCUMENTS

CA    2096360 C    2/2002
CN    203450055 U    2/2014
(Continued)

OTHER PUBLICATIONS

Extended European search report for Application No. 21188670.0; dated Jan. 24, 2022., 10 pages.

Primary Examiner — Krystal Robinson
(74) Attorney, Agent, or Firm — Billion & Armitage

(57) ABSTRACT

A high voltage power cable assembly for a power distribution system of a vehicle incorporating an integrated cooling system is presented. The power cable assembly comprises first and second electrical conductors spaced apart from one another and extending longitudinally. The power cable assembly further comprises a longitudinally extending cooling tube arranged between the first and second electrical conductors such that opposing portions of an external surface of the cooling tube are provided in direct contact with corresponding portions of the insulating material of the electrical conductors over a heat exchange region so as to transfer heat from the electrically conductive core of the electrical conductors to a coolant medium circulating in an internal channel of the cooling tube.

14 Claims, 4 Drawing Sheets

(51) Int. Cl.
  *H01B 9/00* (2006.01)
  *H02B 1/20* (2006.01)
  *H02B 1/56* (2006.01)

(56) References Cited

U.S. PATENT DOCUMENTS

| | | | |
|---|---|---|---|
| 5,670,860 | A | 9/1997 | Conrady et al. |
| 6,825,584 | B2 | 11/2004 | Kulig et al. |
| 9,701,210 | B2 | 7/2017 | Woo et al. |
| 10,109,395 | B2 | 10/2018 | Beimdieck et al. |
| 10,766,374 | B2 | 9/2020 | Heyne et al. |
| 10,800,276 | B2 | 10/2020 | Grienitz et al. |
| 10,811,170 | B2 | 10/2020 | Gontarz et al. |
| 2009/0167078 | A1* | 7/2009 | Watanabe ............... H01B 7/16 307/10.1 |
| 2017/0320454 | A1 | 11/2017 | Froeschl |
| 2017/0338006 | A1* | 11/2017 | Gontarz ............... H01R 13/005 |
| 2018/0190410 | A1* | 7/2018 | Cao ........................ H01B 9/006 |
| 2018/0277283 | A1 | 9/2018 | Remisch et al. |
| 2018/0304757 | A1 | 10/2018 | Vaughan |
| 2019/0131035 | A1 | 5/2019 | Führer et al. |
| 2019/0214161 | A1 | 7/2019 | Chen et al. |
| 2019/0237218 | A1 | 8/2019 | Heyne et al. |
| 2019/0308519 | A1 | 10/2019 | Tsukamoto |
| 2020/0343022 | A1 | 10/2020 | Tasiopoulos et al. |
| 2020/0361327 | A1 | 11/2020 | Heyne et al. |
| 2020/0391601 | A1 | 12/2020 | Maeshiro |
| 2022/0144111 | A1* | 5/2022 | Logakis ............... B60L 53/302 |

FOREIGN PATENT DOCUMENTS

| | | |
|---|---|---|
| CN | 106782835 A | 5/2017 |
| CN | 106849227 A | 6/2017 |
| CN | 106849228 A | 6/2017 |
| CN | 106849238 A | 6/2017 |
| CN | 206314142 U | 7/2017 |
| CN | 107082030 A | 8/2017 |
| CN | 206697276 U | 12/2017 |
| CN | 206741986 U | 12/2017 |
| CN | 107640046 A | 1/2018 |
| CN | 206864231 U | 1/2018 |
| CN | 207082683 U | 3/2018 |
| CN | 107933340 A | 4/2018 |
| CN | 207374157 U | 5/2018 |
| CN | 108199162 A | 6/2018 |
| CN | 108372794 A | 8/2018 |
| CN | 108377633 A | 8/2018 |
| CN | 108461188 A | 8/2018 |
| CN | 108461952 A | 8/2018 |
| CN | 108597654 A | 9/2018 |
| CN | 108878014 A | 11/2018 |
| CN | 108922658 A | 11/2018 |
| CN | 208093243 U | 11/2018 |
| CN | 208111849 U | 11/2018 |
| CN | 208189243 U | 12/2018 |
| CN | 208263991 U | 12/2018 |
| CN | 109148015 A | 1/2019 |
| CN | 109215872 A | 1/2019 |
| CN | 109323496 A | 2/2019 |
| CN | 208460422 U | 2/2019 |
| CN | 208538552 U | 2/2019 |
| CN | 208539163 U | 2/2019 |
| CN | 208706298 U | 4/2019 |
| CN | 208753040 U | 4/2019 |
| CN | 109788713 A | 5/2019 |
| CN | 109935415 A | 6/2019 |
| CN | 109969022 A | 7/2019 |
| CN | 110014954 A | 7/2019 |
| CN | 110098011 A | 8/2019 |
| CN | 110136877 A | 8/2019 |
| CN | 110416777 A | 11/2019 |
| CN | 209747218 U | 12/2019 |
| CN | 209804304 U | 12/2019 |
| CN | 209912570 U | 1/2020 |
| CN | 209962721 U | 1/2020 |
| CN | 111016707 A | 4/2020 |
| CN | 111048247 A | 4/2020 |
| CN | 210295942 U | 4/2020 |
| CN | 111106488 A | 5/2020 |
| CN | 111200200 A | 5/2020 |
| CN | 210516261 U | 5/2020 |
| CN | 210640035 U | 5/2020 |
| CN | 210805262 U | 6/2020 |
| CN | 211237803 U | 8/2020 |
| CN | 211294720 U | 8/2020 |
| CN | 211295493 U | 8/2020 |
| CN | 211479709 U | 9/2020 |
| CN | 211592278 U | 9/2020 |
| CN | 211605534 U | 9/2020 |
| CN | 211641866 U | 10/2020 |
| CN | 212073704 U | 12/2020 |
| CN | 107425323 B | 7/2022 |
| DE | 3627149 C2 | 4/1993 |
| DE | 102011014908 A1 | 11/2011 |
| DE | 202017102535 U1 | 5/2018 |
| DE | 102018113450 A1 | 12/2019 |
| DE | 102019114765 B3 | 10/2020 |
| EP | 0562331 B1 | 9/1997 |
| EP | 0824285 B1 | 3/2000 |
| EP | 2637179 A1 | 9/2013 |
| EP | 2652754 A1 | 10/2013 |
| EP | 3043421 A1 | 7/2016 |
| EP | 3734618 A1 | 11/2020 |
| FR | 2935475 A1 | 3/2010 |
| FR | 3050192 A1 | 10/2017 |
| IN | 209489044 U | 10/2019 |
| JP | 2020182298 A | 11/2020 |
| KR | 20090103405 A | 10/2009 |
| KR | 20200030929 A | 3/2020 |
| KR | 102120306 B1 | 6/2020 |
| WO | 2012079631 A1 | 6/2012 |
| WO | 2017081050 A1 | 5/2017 |
| WO | 2017162464 A1 | 9/2017 |
| WO | 2017162651 A1 | 9/2017 |
| WO | 2018060151 A1 | 4/2018 |
| WO | 2019062974 A1 | 4/2019 |
| WO | 2019184882 A1 | 10/2019 |
| WO | 2019224267 A2 | 11/2019 |
| WO | 2020002485 A1 | 1/2020 |
| WO | 2020053104 A1 | 3/2020 |
| WO | 2020114888 A1 | 6/2020 |

* cited by examiner

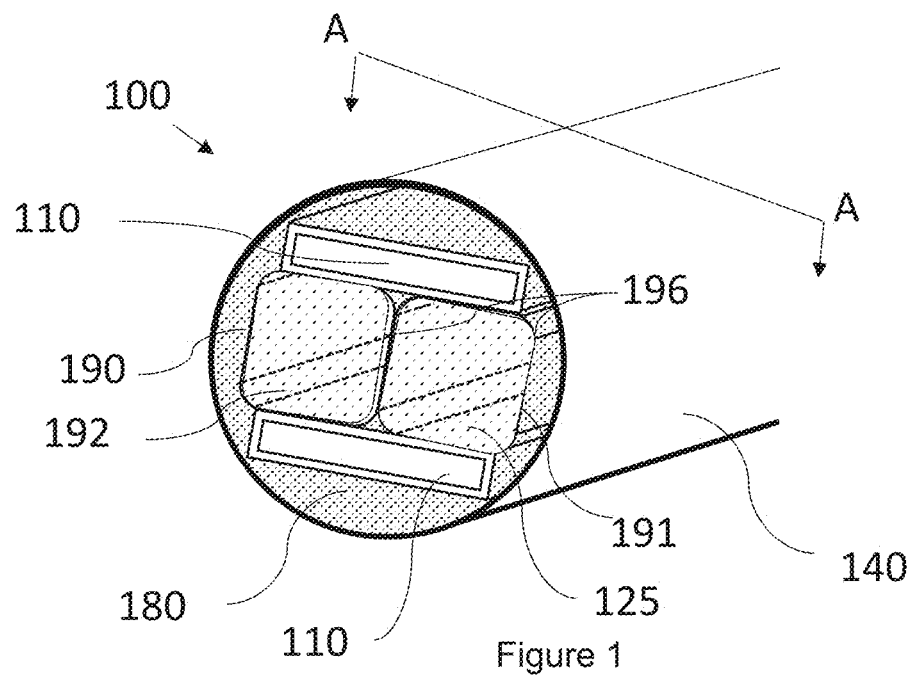
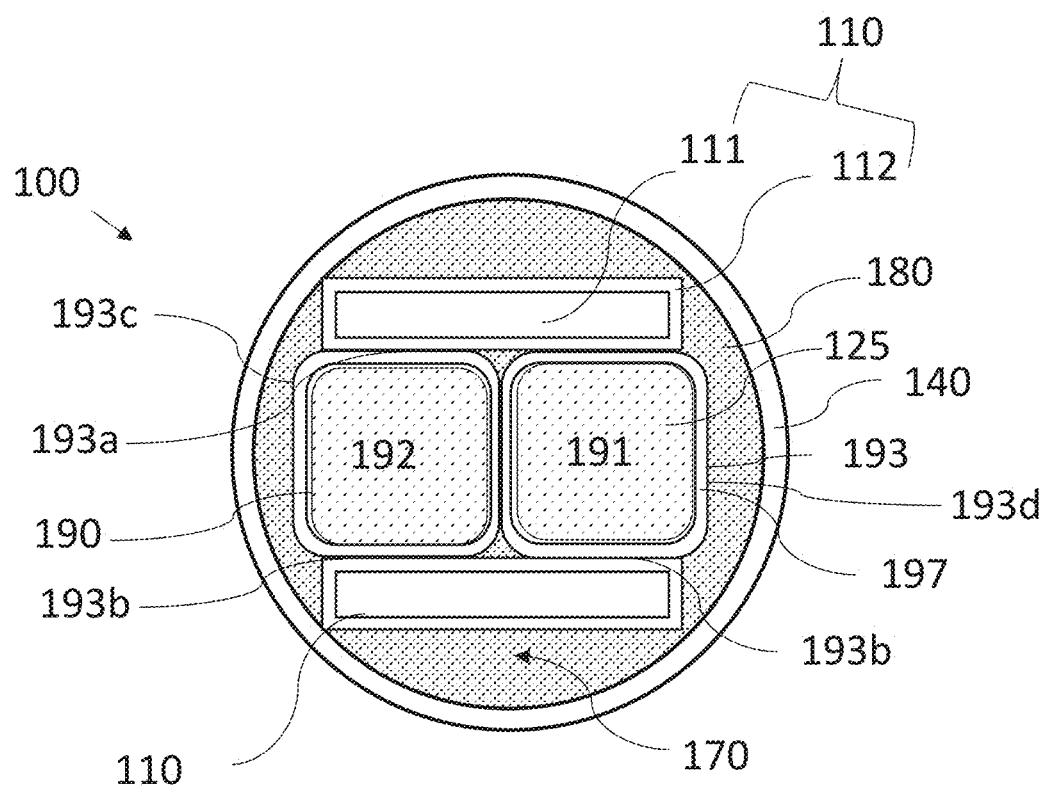

POWER CABLE ASSEMBLY FOR A POWER DISTRIBUTION SYSTEM HAVING AN INTEGRATED COOLING SYSTEM

CROSS-REFERENCE TO RELATED APPLICATION

This application claims benefit of priority to European Patent Application No. 21188670.0 filed on Jul. 30, 2021, the entire disclosure of which is hereby incorporated by reference.

TECHNICAL FIELD OF THE INVENTION

The present application relates in general to a power cable assembly, and more particularly, to a high voltage power cable assembly for a power distribution system incorporating an integrated coiling system.

BACKGROUND

Charging of high voltage batteries, for example, in the field of automotive technology, requires the use of heavy gauge high voltage (HV) power cables that can handle the level of current required to ensure fast charging. The HV power cables used in battery charging applications and/or power distribution applications are usually provided with a cooling system to ensure that the heat generated at the electrical conductor due to the high current flow is dissipated away, thereby increasing the efficiency and safety of the charging operation.

In one existing approach of the prior art, passive cooling solutions may be applied to reduce the temperature dissipated by an HV power cable. However, passive cooling solutions are limited due to manufacturing and weight constraints. For example, changing the dimensions of the components, e.g., increase the electrical conductor gauges to reduce temperature, would increase the weight and cost of the power cable assembly while reducing its flexibility.

Examples of known cable cooling systems are described in KR102120306 and WO201860151. Typically, known power cable assemblies use one or more busbars to carry the electrical power and large heat sinks or air-cooling units that are designed to dissipate the heat generated during operation at the busbar.

Therefore, there is a need to provide a power cable assembly with an improved cooling system that addresses the problems of existing solutions.

SUMMARY

It is an aim of the present disclosure to provide an improved power cable assembly with an integrated cooling system and a power distribution system incorporating the improved power cable assembly.

According to an aspect of the present disclosure, a power cable assembly including a power cable core that has first and second electrical conductors spaced apart from one another and extending longitudinally. Each electrical conductor comprising an electrically conductive core surrounded by an insulating material. The power cable core also has a longitudinally extending cooling tube comprising a thermally conductive wall defining an interior channel for circulating, between a coolant inlet and a coolant outlet of the cooling tube, a coolant medium. The power cable core further has an insulating layer surrounding the power cable core. The cooling tube is arranged between the first and second electrical conductors such that opposing portions of an external surface of the thermally conductive wall are provided in direct contact with corresponding portions of the insulating material of the electrical conductors over a heat exchange region so as to transfer heat from the electrically conductive core of the electrical conductors to the coolant medium circulating in the interior channel of the cooling tube.

The cooling tube of the power cable assembly is provided between the electrical conductors, which may be in the form of insulated busbars. As a result, portions of the external surface of the thermally conductive wall of the cooling tube are provided in direct contact with corresponding portions of the external surface of each of the electrical conductors. The contact between the corresponding external surfaces defines a heat transfer region where heat generated at the electrically conductive core is transfer via the thermally conductive wall to the coolant medium circulated in the cooling tube. The proposed arrangement of the cooling tube offers the advantage of improved heat dissipation using a reduced number of cooling tubes in comparison to prior solutions, thereby reducing the manufacturing cost and the weight of the power cable assembly.

According to embodiments of the present disclosure, the cooling tube comprises a first tube segment defining a forward flow path for the coolant medium, and a second tube segment extending parallel to the first tube segment and defining a return flow path for the coolant medium between the coolant inlet and coolant outlet, the first tube segment and second tube segment are connected via a curved segment.

According to embodiments of the present disclosure, the coolant inlet and the coolant outlet of the cooling tube are arranged at the same end of the power cable assembly.

According to embodiments of the present disclosure, the cooling tube has a U shape.

The cooling tube may be in the form of a single tube extending between a coolant inlet and a coolant outlet. To improve the form factor of the power cable assembly and ease the connection of the cooling tube to the cooling system, it may be beneficial to have the coolant inlet and coolant outlet at the same end of the power cable assembly. As a result, the cooling tube may be folded so as to define a forward flow path and a return path for the coolant medium, extending parallel to one another. In this configuration, the cooling tube may be of a U-shape, or equivalent, comprising a first segment configured for directing the coolant medium over a forward flow path from the coolant inlet to a distal end of the power cable assembly and a second segment configured for directing the coolant medium over a return flow path to the coolant outlet. The first and second tube segments are configured to extend parallel to one another and are connected via a curved segment positioned at a desired location along the length of the power cable assembly. It should be noted that in alternative embodiments, the power cable core may be provided with one or more cooling tubes provided as straight tubes extending between a coolant inlet and a coolant outlet provided on opposing ends of the power cable assembly.

According to embodiments of the present disclosure, the cooling tube is made from a flexible polymer material.

According to embodiments of the present disclosure, the thickness of the thermally conductive wall of the cooling tube is between 0.5 mm and 2.0 mm.

According to embodiments of the present disclosure, the insulating layer is arranged to apply a compressive force on the power cable core causing the thermally conductive wall of the cooling tube to elastically deform so as to extend the heat transfer region between the cooling tube and electrical conductors.

The thermally conductive of the cooling tube may be configured to be elastically deformed when a compressive force is applied. For example, the insulating material, also referred to as insulated jacket, provided around the electrical conductors, may be arranged to compress the electrical conductors to prevent relative movement of the electrical conductors and cooling tube. As a result, due to the compressive force applied by the insulating layer and the flexible nature of the cooling tube, the thermally conductive wall is elastically deformed. The elastic deformation of the cooling tube would increase the contact area between the portions of the external surface of the cooling tube and the corresponding portions of the electrical conductors, thereby improving the heat transfer between the electrical conductors and the cooling medium. The cooling tube may be provided with a round or an oval shape, which, when compressed, may assume a generally rectangular shape defining opposing first and second major planar surfaces provided in direct contact with corresponding surfaces of the electrical conductors. The thickness of the thermally conductive wall of the cooling tube may be adjusted so as to ensure sufficient flexibility and heat transfer properties without compromising safety.

According to embodiments of the present disclosure, wherein the power cable core comprises a thermal interface material (TIM) surrounding the cooling tube and the electrical conductors. The TIM is configured to thermally couple the thermal conductive external surface of the cooling tube to the electrical conductors such that heat generated by the electrically conductive cores is transferred to the coolant medium.

According to embodiments of the present disclosure, the thermal interface material, TIM, comprises any one of: a potting material, a grease material, a paste material, a semi-solid material, or a phase-change material.

To further improve the cooling of the electrical conductors, a thermal interface material (TIM) may be provided in contact with the electrical conductors and the cooling tube positioned therein between. The TIM is configured to extend the heat exchange region and create a heat transfer area for transferring heat from the electrical conductors to the cooling tube, thereby further improving the cooling of the electrical conductors. The TIM may be any suitable material, such as phase change materials, gap fillers, thermal grease, thermal interface film and the like. The TIM may be provided in a variety of forms, such as liquid, paste, film, and the like. Furthermore, the TIM may be cured under desired conditions so as to create a solid core. The TIM encapsulates the electrical conductors and the cooling tube positioned therein to improve heat exchange between the electrical conductors and the cooling tube, thereby improving the efficiency of the power cable assembly.

According to embodiments of the present disclosure, the high voltage power cable assembly of any one of the preceding claims, wherein the electrical conductors are in the form of busbars having a rectangular cross-sectional profile.

According to embodiments of the present disclosure, each electrical conductor is arranged to carry a different voltage level.

According to a second aspect of the present disclosure, a cooling system is provided, for coupling to a power cable assembly according to embodiments of the first aspect for circulating a cooling medium between the coolant inlet and coolant outlet of the interior channel of the cooling tube. The cooling system includes a pump, a cooling unit; and one or more connectors for connecting the coolant inlet and coolant outlet to a cooling system. The coolant medium is circulated, via the cooling unit, through the interior channel of the cooling tube between the coolant inlet and the coolant outlet.

The coolant inlet and the coolant outlet are connected, via one or more connectors, to a cooling system provided in fluid communication with the power cable assembly. The cooling system is provided as a closed-loop coolant circulation system. The cooling unit is configured to extra the heat from the coolant medium exiting the coolant outlet.

According to embodiments of the present disclosure, the coolant medium is a water-based fluid. Since portions of the cooling tube are provided in contact with the insulating layer of the busbar, several types of coolant mediums may be used, such as non-dielectric coolant mediums. For example, the coolant medium provided in the cooling tube may be a water-based coolant such as water and glycol mixture. Equally, the coolant medium may be a dielectric coolant such as oil-based fluid or another suitable dielectric coolant.

According to a third aspect of the present disclosure, a power distribution system of a vehicle is provided that includes a power cable assembly as described above extending between first and second end contact surfaces configured for coupling, via first and second connectors, to respective electrical connections of the power distribution system and an integrated cooling system as described above, coupled to the power cable assembly, for circulating the cooling medium between the coolant inlet and coolant outlet of the interior channel of the cooling tube.

To ensure that the power cable can be integrated into a system such as a vehicle power distribution system, the power cable assembly may be shaped into the desired shape to enable easy integration for the desired application.

BRIEF DESCRIPTION OF THE DRAWINGS

The present invention is now described, by way of example with reference to the accompanying drawings, in which:

FIG. 1 shows perspective view of an exemplary power cable assembly according to embodiments of the present disclosure;

FIG. 2 shows a transverse cross-sectional view of the power cable assembly of FIG. 1 along line A-A according to embodiments of the present disclosure;

DETAILED DESCRIPTION

Figure 3:
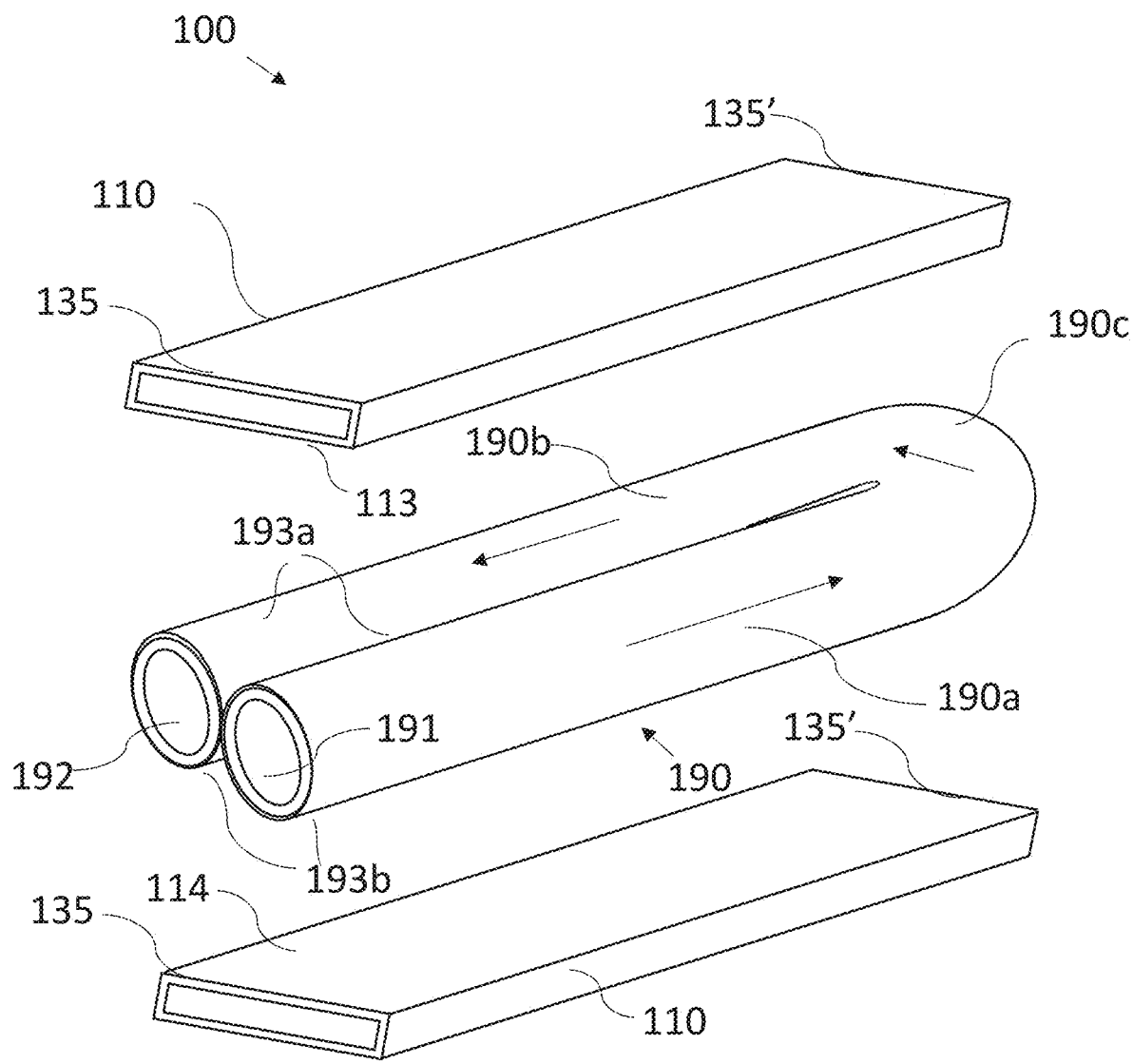
FIG. 3 shows exploded view of the power cable assembly of FIG. 1 showing the busbars and a cooling tube, in an uncompressed state, having a U-shape according to embodiments of the present disclosure.

The following discussion provides many exemplary embodiments of the inventive subject matter. Although each embodiment represents a single combination of inventive elements, the inventive subject matter is considered to include all possible combinations of the disclosed elements. Thus, if one embodiment comprises elements A, B, and C, and a second embodiment comprises elements B and D, then the inventive subject matter is also considered to include other remaining combinations of A, B, C, or D, even if not explicitly disclosed.

For simplicity and clarity of illustration, reference numerals may be repeated among the Figures to indicate corresponding or analogous elements. Numerous details are set forth to provide an understanding of the examples described herein. The examples may be practised without these details. In other instances, well-known methods, procedures, and components are not described in detail to avoid obscuring the examples described. The description is not to be considered as limited to the scope of the examples described herein.

FIGS. 1 to 3 show an exemplified implementation of a power cable assembly 100 having the coolant inlet 191 and coolant outlet 192 at the same end of the power cable assembly 100 according to embodiments of the present disclosure. Having the coolant inlet 191 and coolant outlet 192 on the same end of the power cable assembly 100 may reduce the form factor of the power cable assembly 100 and the cost of manufacturing.

The power cable assembly 100 comprises a first and a second electrical conductor 110, which may be in the form of insulated busbars, spaced apart from one another. Each of the insulated busbars 100 comprise an electrically conductive core 111 surrounded by an insulating layer 112. The busbars 110 are electrically conductive and extend longitudinally between a first contact end surface 135 and a second end contact surface 135' at opposing ends of each busbar 110 and of the power cable assembly 100. The contact surfaces 135 and 135' are conducting surfaces. For example, each busbar 110 may be coupled via first and second connectors to a node of an electrical connection, respectively. Each busbar 110 may be configured to carry a different voltage level.

A cooling tube 190, also referred to as cooling pipe, is provided between the first and second busbars 110, such that opposing portions 193a, 193b an external surface 193 of a thermally conducting wall 197 of the cooling tube 190 are provided in direct contact with corresponding portions 113, 114 of the insulating layer 112 of the insulated busbar 110 over a heat exchange region. As a result, heat generated at the conductive core 111 of each insulated busbar 110 is transferred over the heat exchange region to the cooling medium circulating into an interior channel 196 defined by the thermally conductive wall 197 of the cooling tube 190 between a coolant inlet 191 and a coolant outlet 192. The coolant medium 125 is provided by a cooling system 300 arranged in fluid communication with the cooling tube 190. The coolant medium 125 may be a water-based coolant such as a water and glycol mixture. Equally, the coolant medium 125 may be a dielectric coolant such as purified water, oil-based coolant, or the like.

As shown in FIG. 3, the cooling tube 190 is U-shaped, thereby providing a first segment 190a configured for directing the coolant medium 125 along a forward flow path, and the second segment 190b provided parallel to the first segment 190a defining a return path for the coolant medium 125 to the outlet 192. The first segment 190a and the second segment 190b are connected to one another via a curved segment 190c. In general, the cooling tube 190 is configured to extend along the length of the busbars 110 to ensure maximum heat dissipation. In the arrangement shown in FIGS. 1 to 3, each segment of the cooling tube 190 may be made from a flexible polymer material, such as synthetic rubber, having a wall 197 thickness between 0.5 mm and 2.0 mm.

The sandwiched arrangement of the busbar 110 and the cooling tube 190 may be collectively referred to as the power cable core 170.

To further improve heat dissipation between the first and second busbars 110, the busbars 110 and the cooling tube 190 may be optionally embedded in a thermal interface material, TIM, 180. The TIM 180 is configured to thermally couple the insulated busbars 110 with the cooling tube 190, thereby extending the heat exchange region defined between the insulated busbars 110 and the cooling tube 190. The use of TIM 180 ensures that the entire external surface of the cooling tube 190 is thermally coupled to the busbars 110. As such, portions 193c, 193d of the external surface 193, which are not in direct contact with the cooling tube 190, can be used to absorb heat from the busbars 110. Therefore, the use of TIM 180 further improves heat dissipation from the busbar 110 to the cooling medium circulating in the interior channel 196 of the cooling tube 190. The TIM 180 may be a suitable material for efficiently transferring heat between surfaces. For example, the TIM 180 may be provided as a paste, a liquid, a film or sheet, and the like. The TIM 180 may be any one of, but not limited to, a potting material, a grease material, a paste material, a semi-solid material, or a phase-change material. The TIM 180, once applied, may be cured so as to encapsulate the busbars 110 and the cooling tube 190. In this arrangement, the TIM 180 is part of the power cable core 170 previously described.

As shown in FIGS. 1 and 2, an insulating material, also referred to as an insulated jacket 140, is provided around the power cable core 170. The insulated jacket 140 may be arranged to compress the power cable core 170 to prevent relative movement of the busbars 110 and cooling tube 190. The compressive force applied by the material of the insulated jacket 140 causes the flexible cooling tube 190 to elastically deform, as shown in FIG. 2. For example, in the uncompressed state, the cooling tube 190 may have a cylindrical or oval shape, as shown in FIG. 3. However, when compressed, the cooling tube 190 may have a rectangular shape, as shown in FIG. 2. The elastic deformation of the cooling tube 190 extends the available contact surface of the thermally conductive wall 197 that is provided in direct contact with the busbars 110, thereby improving heat dissipation.

Figure 4:
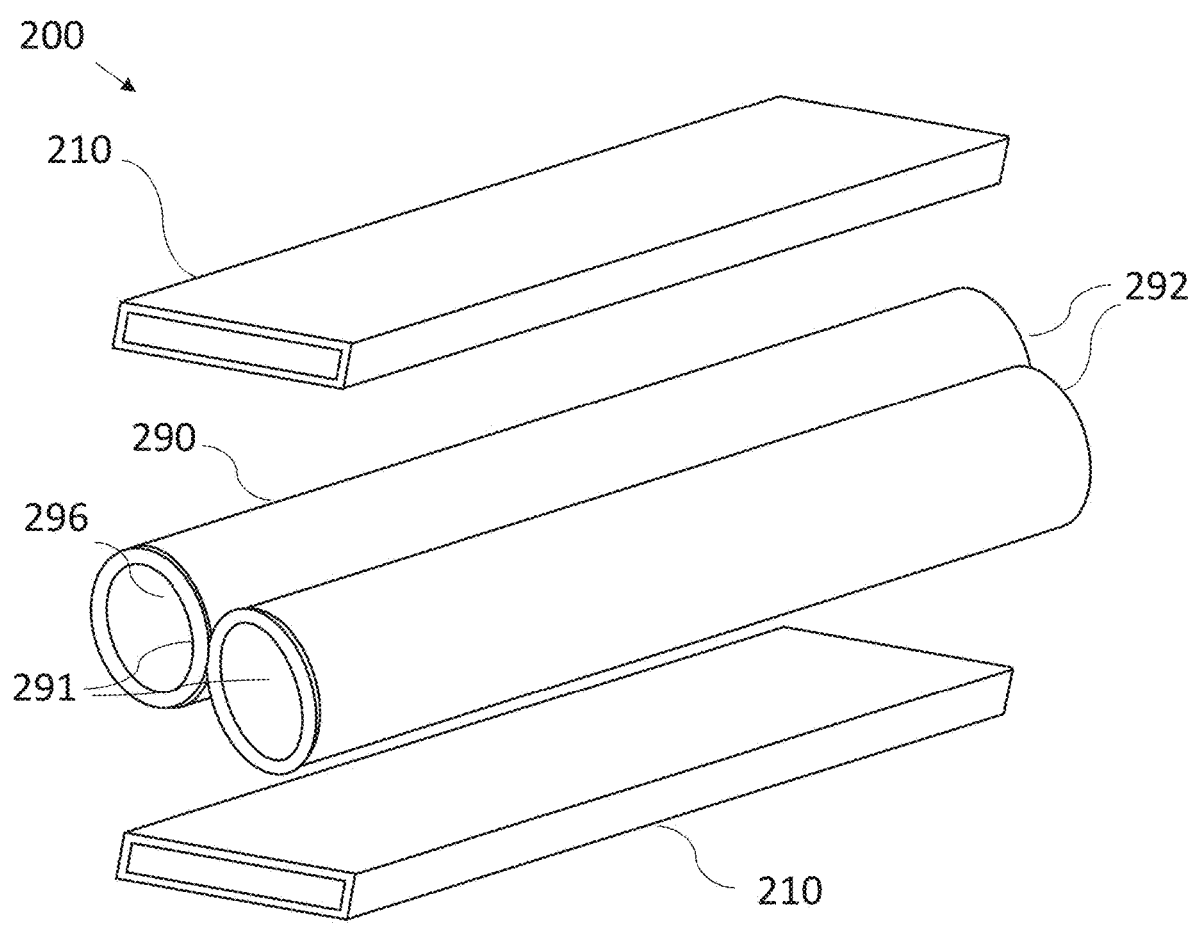
FIG. 4 shows an exploded view of an alternative power cable assembly providing two straight cooling tubes, showing in an uncompressed state, with the inlet and outlets provided at opposing ends of the power cable assembly according to embodiments of the present disclosure.

FIG. 4 shows an alternative arrangement for a power cable assembly 200 with bus bars 210 and two straight cooling tubes 290 rather than a U-shaped cooling tube 190, shown in FIGS. 1 to 3. In this configuration, the coolant inlet 291 and coolant outlets 292 are provided on opposite ends of the power cable assembly 200.

In the exemplary arrangements of FIGS. 1 to 4, the power cable assembly 100 has a generally cylindrical form. As illustrated, the busbars 110 have a generally rectangular cross-sectional profile. As previously discussed, the cooling tube 190 or 290, in the uncompressed state, has a round or oval cross-sectional profile, while in the compressed state, the cross-sectional profile of the cooling tube changes to a more rectangular shape. It will, however, be appreciated that the busbars and the cooling tube 190, 290 may be provided in other suitable forms. The busbars 110 and/or the cooling tube 190 may, for example, have an oval or circular form in cross-section.

Figure 5:
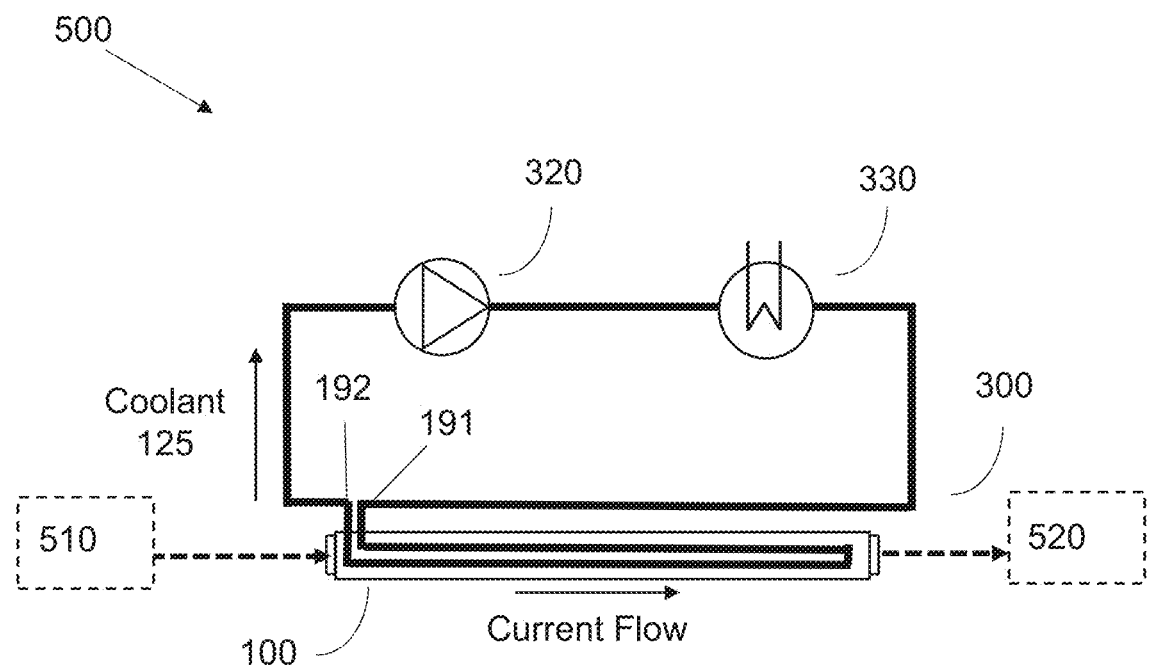
FIG. 5 is a block diagram showing an exemplary power distribution charging system using a power cable assembly of FIGS. 1 to 3 according to embodiments of the present disclosure.

FIG. 5 shows an exemplified implementation of a power distribution system 500 of a vehicle incorporating the power cable assembly 100 of FIGS. 1 to 3. The exemplary power distribution system 500 comprises the power cable assembly 100 and an integrated cooling system 300. The power cable assembly 100 is coupled to the cooling system 300 via corresponding connectors provided at the inlet 191 and outlet 192 points of the power cable assembly 100. The cooling system 300 provides a closed-loop coolant circulation system when the cooling medium is circulated by means of a pump 320 from the coolant outlet 192 of interior channel 196 of the cooling tube 190 to a cooling unit 330, where the heat from the coolant medium 125 is extracted, and the coolant medium 125 is fed back to the interior channel 196 via the coolant inlet 191.

The power distribution system 500 may be configured for transmitted electrical power, via a power cable assembly 100, between a first electrical connection 510 and a second electrical connection 520 of a vehicle.

In the exemplary arrangement of FIG. 5, the coolant inlet and coolant outlet are located on the same side of the power cable assembly 100.

Figure 6:
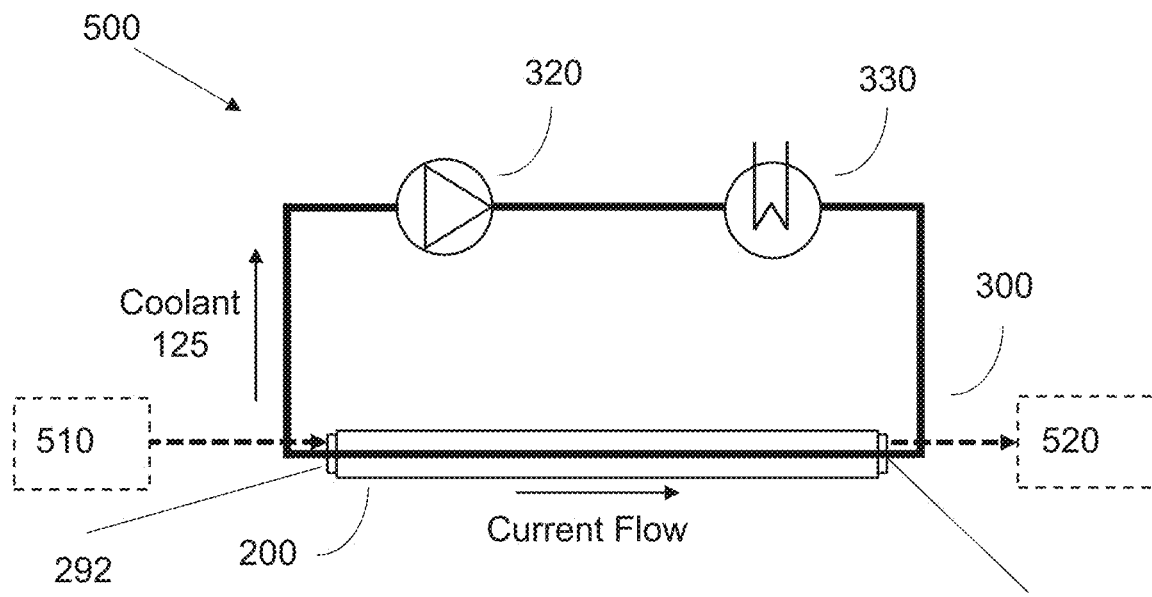
FIG. 6 is a block diagram that illustrates the exemplary power distribution charging system of FIG. 5 using the power cable assembly of FIG. 4 according to embodiments of the present disclosure.

FIG. 6 shows the exemplified power distribution system 500 of FIG. 5 incorporating the power cable assembly 200 of FIG. 4, whereby the inlet 291 and outlet 292 are positioned on opposing ends of the power cable assembly 100. The power distribution system 500 of FIG. 6 operates in the same way as the one presented with reference to FIG. 5, but in this arrangement, the coolant inlet 291 and coolant outlets 292 of interior channel 296 are positioned on opposing ends of the power cable assembly 200.

While the power distribution system 500 and power cable assembly 100 and 200 of the present disclosure have been described in terms of the preferred embodiments thereof, it is not intended to be so limited, but rather only to the extent set forth in the claims that follow.

While this invention has been described in terms of the preferred embodiments thereof, it is not intended to be so limited, but rather only to the extent set forth in the claims that follow. For example, the above-described embodiments (and/or aspects thereof) may be used in combination with each other. In addition, many modifications may be made to configure a particular situation or material to the teachings of the invention without departing from its scope. Dimensions, types of materials, orientations of the various components, and the number and positions of the various components described herein are intended to define parameters of certain embodiments and are by no means limiting and are merely prototypical embodiments.

Many other embodiments and modifications within the spirit and scope of the claims will be apparent to those of skill in the art upon reviewing the above description. The scope of the invention should, therefore, be determined with reference to the following claims, along with the full scope of equivalents to which such claims are entitled.

As used herein, 'one or more' includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Additionally, while terms of ordinance or orientation may be used herein these elements should not be limited by these terms. All terms of ordinance or orientation, unless stated otherwise, are used for purposes distinguishing one element from another, and do not denote any order of arrangement, order of operations, direction or orientation unless stated otherwise.

The invention claimed is:

1. A power cable assembly, comprising:
a power cable core, comprising:
first and second electrical conductors spaced apart from one another and extending longitudinally, each electrical conductor comprising an electrically conductive core surrounded by an insulating material;
a longitudinally extending cooling tube made from a flexible polymer material and comprising a thermally conductive wall defining an interior channel for circulating, between a coolant inlet and a coolant outlet of the cooling tube, a coolant medium; and
an insulating layer surrounding the power cable core, wherein the cooling tube is arranged between the first and second electrical conductors such that opposing portions of an external surface of the thermally conductive wall are provided in direct contact with corresponding portions of the insulating material of the electrical conductors over a heat exchange region so as to transfer heat from the electrically conductive core of the electrical conductors to the coolant medium circulating in the interior channel of the cooling tube.

2. The power cable assembly according to claim 1, wherein the cooling tube comprises a first tube segment defining a forward flow path for the coolant medium, and a second tube segment extending parallel to the first tube segment and defining a return flow path for the coolant medium between the coolant inlet and coolant outlet, the first tube segment and second tube segment are connected via a curved segment.

3. The power cable assembly of claim 2, wherein the coolant inlet and the coolant outlet of the cooling tube are arranged at the same end of the power cable assembly.

4. The power cable assembly according to claim 1, wherein the cooling tube has a U shape.

5. The power cable assembly according to claim 1, wherein the power cable core comprises a single cooling tube.

6. The power cable assembly according to claim 1, wherein the power cable core comprises one or more straight cooling tubes extending between a coolant inlet and a coolant outlet provided at opposite ends of the power cable assembly.

7. The power cable assembly according to claim 1, wherein a thickness of the thermally conductive wall of the cooling tube is between 0.5 mm and 2.0 mm.

8. The power cable assembly according to claim 1, wherein the electrical conductors are in the form of busbars having a rectangular cross-sectional profile.

9. The power cable assembly according to claim 1, wherein each electrical conductor is arranged to carry a different voltage level.

10. A cooling system configured for coupling to the power cable assembly according to claim 1, for circulating a cooling medium between the coolant inlet and coolant outlet of the interior channel of the cooling tube, the cooling system comprising:
   a pump,
   a cooling unit; and
   one or more connectors for connecting the coolant inlet and coolant outlet to the cooling system, wherein the coolant medium is circulated, via the cooling unit, through the interior channel of the cooling tube between the coolant inlet and the coolant outlet.

11. A power distribution system of a vehicle, the power distribution system comprising:
   the power cable assembly according to claim 1, extending between first and second end contact surfaces configured for coupling, via first and second connectors, to respective electrical connections of the power distribution system; and
   an integrated cooling system, comprising:
      a pump,
      a cooling unit; and
      one or more connectors for connecting the coolant inlet and coolant outlet to the cooling system, wherein the coolant medium is circulated, via the cooling unit, through the interior channel of the cooling tube between the coolant inlet and the coolant outlet.

12. A power cable assembly, comprising:
   a power cable core, comprising:
      first and second electrical conductors spaced apart from one another and extending longitudinally, each electrical conductor comprising an electrically conductive core surrounded by an insulating material;
      a longitudinally extending cooling tube comprising a thermally conductive wall defining an interior channel for circulating, between a coolant inlet and a coolant outlet of the cooling tube, a coolant medium; and
   an insulating layer surrounding the power cable core, wherein the cooling tube is arranged between the first and second electrical conductors such that opposing portions of an external surface of the thermally conductive wall are provided in direct contact with corresponding portions of the insulating material of the electrical conductors over a heat exchange region so as to transfer heat from the electrically conductive core of the electrical conductors to the coolant medium circulating in the interior channel of the cooling tube, wherein the insulating layer is arranged to apply a compressive force on the power cable core causing the thermally conductive wall of the cooling tube to elastically deform so as to extend the heat transfer region between the cooling tube and electrical conductors.

13. A power cable assembly, comprising:
   a power cable core, comprising:
      first and second electrical conductors spaced apart from one another and extending longitudinally, each electrical conductor comprising an electrically conductive core surrounded by an insulating material;
      a longitudinally extending cooling tube comprising a thermally conductive wall defining an interior channel for circulating, between a coolant inlet and a coolant outlet of the cooling tube, a coolant medium; and
   an insulating layer surrounding the power cable core, wherein the cooling tube is arranged between the first and second electrical conductors such that opposing portions of an external surface of the thermally conductive wall are provided in direct contact with corresponding portions of the insulating material of the electrical conductors over a heat exchange region so as to transfer heat from the electrically conductive core of the electrical conductors to the coolant medium circulating in the interior channel of the cooling tube, wherein the power cable core comprises a thermal interface material (TIM) surrounding the cooling tube and the electrical conductors, the TIM configured to thermally couple the external surface of the cooling tube to the electrical conductor such that the heat generated at the electrically conductive core is transferred to the coolant medium.

14. The power cable assembly according to claim 13, wherein the TIM is selected from a list consisting of: a potting material, a grease material, a paste material, a semi-solid material, and a phase-change material.

* * * * *